Figure 1:
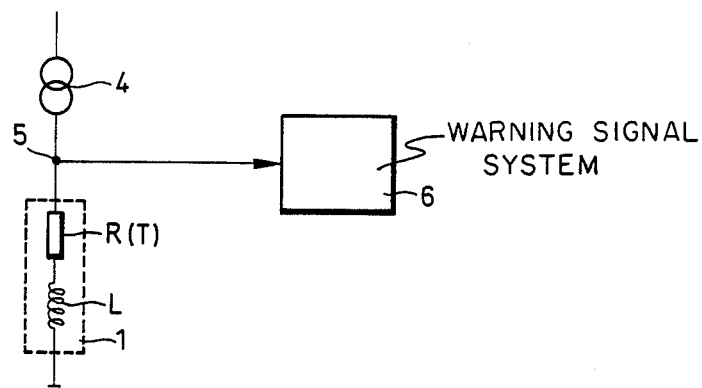

United States Patent [19]

Heinen

[11] Patent Number: 4,799,046

[45] Date of Patent: Jan. 17, 1989

[54] METHOD AND CIRCUIT FOR DETECTING AND MONITORING THE TEMPERATURE OF A WINDING

[75] Inventor: Raymond Heinen, Cologne, Fed. Rep. of Germany

[73] Assignee: Leybold-heraeus GmbH, Cologne, Fed. Rep. of Germany

[21] Appl. No.: 9,267

[22] Filed: Jan. 30, 1987

Related U.S. Application Data

[63] Continuation of Ser. No. 749,010, Jun. 26, 1985, abandoned.

[30] Foreign Application Priority Data

Jul. 6, 1984 [DE] Fed. Rep. of Germany ....... 3424873

[51] Int. Cl.$^4$ ...................... G08B 17/00; F16K 31/02
[52] U.S. Cl. ............................. 340/595; 251/129.15; 340/599
[58] Field of Search ............... 340/588, 595, 599, 660, 340/664; 374/152, 185, 110; 324/71.1, 546, 65 R, 104–105, 145; 73/295; 361/89, 94, 103, 106, 165; 338/7, 13; 251/129.15

[56] References Cited

U.S. PATENT DOCUMENTS

| | | | |
|---|---|---|---|
| 1,531,007 | 3/1925 | Jackson | 251/129.15 |
| 1,858,293 | 5/1932 | Darlington | 374/110 |
| 2,211,606 | 8/1940 | Pratt | 73/295 |
| 2,625,821 | 1/1953 | Stein | 374/152 |
| 2,818,482 | 12/1957 | Bennett | 374/185 |
| 2,912,644 | 11/1959 | Makous | 361/103 |
| 3,145,567 | 8/1964 | Bobrowsky | 73/295 |
| 3,368,788 | 2/1968 | Padula | 251/129.15 |
| 3,776,040 | 12/1973 | Gould, III | 374/185 |
| 3,959,692 | 5/1976 | Wetzel | 361/103 |
| 4,065,967 | 1/1978 | Beeton | 73/295 |
| 4,148,086 | 4/1979 | Landa et al. | 374/152 |
| 4,308,519 | 12/1981 | Garcoa et al. | 340/588 |
| 4,330,808 | 5/1982 | Sawada et al. | 374/152 |
| 4,425,795 | 1/1984 | Albrecht et al. | 73/295 |
| 4,436,438 | 3/1984 | Voznick | 374/185 |

FOREIGN PATENT DOCUMENTS

| | | | |
|---|---|---|---|
| 0067298 | 12/1982 | European Pat. Off. | 251/129 |
| 2536375 | 2/1977 | Fed. Rep. of Germany . | |
| 00542107 | 1/1977 | U.S.S.R. | 374/152 |
| 0781612 | 11/1980 | U.S.S.R. | 374/152 |
| 0815525 | 3/1981 | U.S.S.R. | 374/152 |
| 1064162 | 12/1983 | U.S.S.R. | 374/152 |
| 1107011 | 8/1984 | U.S.S.R. | 374/152 |

OTHER PUBLICATIONS

Gupta et al, "A Novel Technique for the Measurement of Average Rotor Temperature of Brushless Synchronous Machines," IEEE Transactions on Power Apparatus and Systems, vol. Pas-98, No. 4, pp. 1238–1243, Jul./Aug. 1979.

Primary Examiner—Glen R. Swann, III
Assistant Examiner—Thomas J. Mullen, Jr.
Attorney, Agent, or Firm—Felfe & Lynch

[57] ABSTRACT

To monitor the winding temperature of a coil, preferably the magnet coil of a magnetic valve, it is proposed to use as the monitored magnitude the resistance related to the temperature of the winding. For this purpose the winding is supplied during the measurement time with a constant or predeterminable voltage or current and the voltage or current related to the temperature of the winding is used as the magnitude to be measured.

9 Claims, 2 Drawing Sheets

METHOD AND CIRCUIT FOR DETECTING AND MONITORING THE TEMPERATURE OF A WINDING

This is a continuation application of application Ser. No. 749,010, filed June 26, 1985, now abandoned.

BACKGROUND OF THE INVENTION

The invention relates to a method for detecting and monitoring the temperature of the winding of a coil, preferentially the magnet coil of a magnetic valve. The invention furthermore concerns a circuit suitable for the practice of this method.

The size of coils, whether for electric motors, magnetic valves, transformers or the like, depends on the current flowing through the winding. If the current exceeds for any length of time an allowable limit, the heating of the winding can result in insulation damage. To prevent such unacceptably high heating of a coil, it is known (cf. German Federal publication OS No. 25 36 375) to sense the coil temperature by means of a temperature sensor, which simultaneously serves a safety function.

In the case of coils which are subject to heavy loading it is known to operate them briefly with an excess excitation in order to be able to avoid unnecessarily large windings. This technique is known especially in the case of magnetic valves which briefly require a high excitation current during a 'pull-in' phase, while the rest of the time only a so-called holding current is required, which holds the valve plunger in a certain position, e.g., against the force of a spring. The over-excitation during the operating phase serves as a rule to permit more force to be available for the acceleration of the valve plunger than is needed for holding it in a particular position.

Frequently it is necessary to overcome as quickly as possible any load-caused sticking or other forces which may be caused by an unfavorable operating-force characteristic of the driving magnet. The operation of a magnetic valve at briefly elevated excitation leads to an especially economical design of the magnet, since its size can be governed mostly by the holding excitation and the necessary number of operating cycles per unit of time, not by the pull-in excitation alone.

It is the object of the present invention to propose a method and a circuit of the above kind, which will be especially simple and will not require additional sensing means such as a temperature sensor, for example.

THE INVENTION

This object is achieved by the invention by using, as the magnitude to be sensed, the resistance related to the temperature of the winding. Since the temperature coefficients of the resistances of the wires used, as a rule, for making coils are known, the resistance at a known current and at a known voltage drop across the winding can be used as a measure of the temperature of the winding.

Preferably, a constant electric current, or one whose magnitude can be determined, is passed through the winding during the measuring time, and the voltage drop across the winding in relation to the temperature of the winding, is used as the magnitude for measurement. On the other hand, the possibility also exists of applying a voltage to the winding and using the current of the coil, which varies according to the temperature, as the magnitude for measurement.

If the coil is a component of a driver of a magnetic valve which requires a holding current, an especially advantageous further development of the invention consists in using the holding current simultaneously as a constant current for measurement.

Additional advantages and details will be set forth with the aid of the embodiments represented in FIGS. 1 to 4.

FIG. 1 shows a schematic diagram in which - as in the other figures as well - an equivalent-circuit diagram is selected for the winding or coil 1 whose temperature is to be observed, namely a resistance R(T) dependent upon the temperature, and an inductance L. If, on the basis of the DC source 4, a measurement current $I_M$ flows through the winding 1, then there is a certain voltage drop $U_M$ across 1. The equation is the following:

$$U_M = R \cdot I_M$$

The resistances of most wires used in the construction of coils have positive temperature coefficients of the order of several per thousand per degree Kelvin. Copper, for example, has 3.9 to 4.0 per thousand per degree Kelvin, depending on the type.

In the range of technical interest between $-50°$ C. and $+200°$ C., they follow, with sufficient accuracy, the equation:

$$R(T) = R_o(1 + \alpha_R(T - T_o))$$

wherein
 $R(T)$ = resistance at temperature T
 $R_o$ = resistance at temperature $T_o$
 $\alpha_R$ = temperature coefficient of the resistance.
The voltage drop across the coil is thus a measure of the temperature of the winding if the current is known.

$$U_M(T) = I_M \cdot R_o(1 + \alpha_R(T - T_o))$$

If $I_M$, $R_o$, $T_o$ and $\alpha_R$ are known, the temperature T can be arrived at on the basis of $U_M(T)$.

The measurement current does not have to be a pure direct current. It can also contain a large alternating current component (e.g., current from a half-wave or full-wave rectifier circuit with or without phase shift). What matters is that its average be kept constant.

Changes in $U_M$ can be tracked by means of an electronic system generally represented as block 6, which in a suitable manner can produce a warning signal or shutdown.

Figure 2:
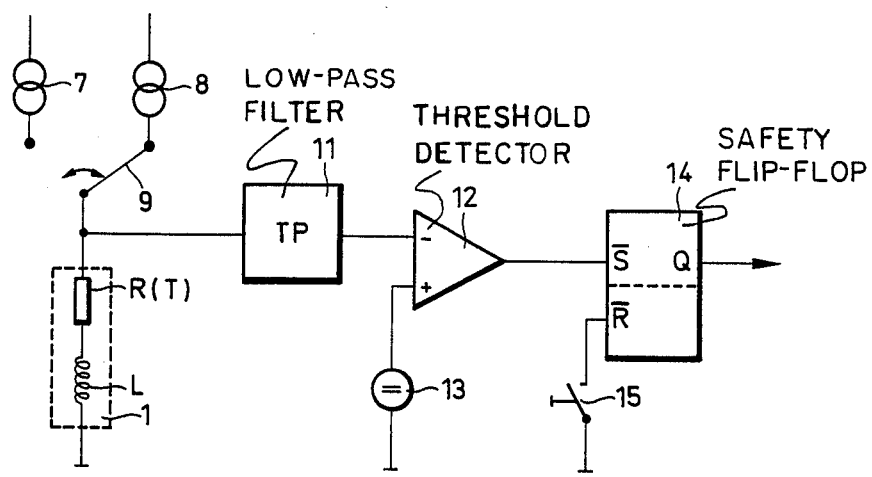

FIG. 2 shows an embodiment which is especially suited for tracking the temperature of magnetic valve coils. The coil or winding 1 is associated with two current sources 7 and 8 which can be selected through the switch 9. The current source 7 supplies a high excitation current which flows during the pull-in phase. A brief over-excitation is acceptable as long as the temperature of the coil remains sufficiently low. Immediately after the pull-in phase a changeover is made to the current source 8 which supplies the holding current, i.e., a relatively low current that holds the body of the valve in a certain position. This holding current can simultaneously be used is the measurement current $I_M$, so that the temperature of coil 1 can be arrived at from the voltage at 5.

In the embodiment shown in FIG. 2, the voltage $U_M$ at 5 is fed through a low-pass filter 11 to a threshold detector 12. The low-pass filter 11, which can also be configured as an integrator, brings it about that the voltage drop across R must occur for a minimum time before it actuates the threshold detector. Very short pulses, such as those caused by the self-induction of the coil or by a very brief period of over-excitation, thus have little or no effect. At the threshold detector 12 a comparison voltage is present which is produced by the voltage source 13 and corresponds to the maximum voltage $U_M$(and thus to the maximum allowable temperature T). The threshold detector 12 in turn actuates a safety flip-flop 14 which can produce a warning signal or a shut-down. The safety flip-flop can be restored by means of the mo switch 15.

Figure 3:
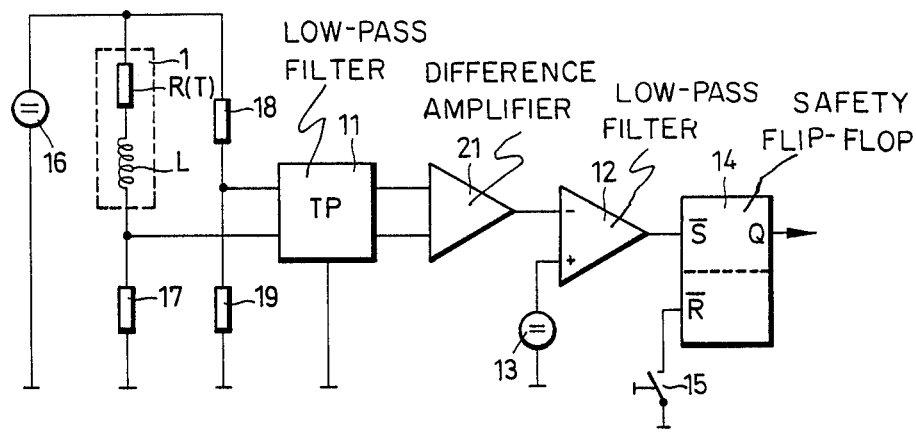

FIG. 3 shows a similar design in which the voltage supplied to the winding 1 is constant. The voltage source is indicated at 16. The input resistance 17 and the resistances 18 and 19 are combined with the coil or winding 1 to constitute a bridge circuit. The temperature coefficient of the resistances 17 to 19 can best be in the range of several $10^{-5}$ per degree Kelvin, i.e., it is preferably two orders of magnitude smaller than the temperature coefficient of the copper wires of the winding 1. The comparison points of the bridge circuit are connected to the inputs of the low-pass filter 11. The low-pass filter 12 is followed in this embodiment first by a difference amplifier 21 which converts the temperature- related bridge voltage to a new reference potential. The components that follow (threshold detector 12, safety flip-flop 14 etc.) correspond to the embodiment shown in FIG. 2.

A mixed AC-DC voltage source can be provided instead of the DC voltage source.

Figure 4:
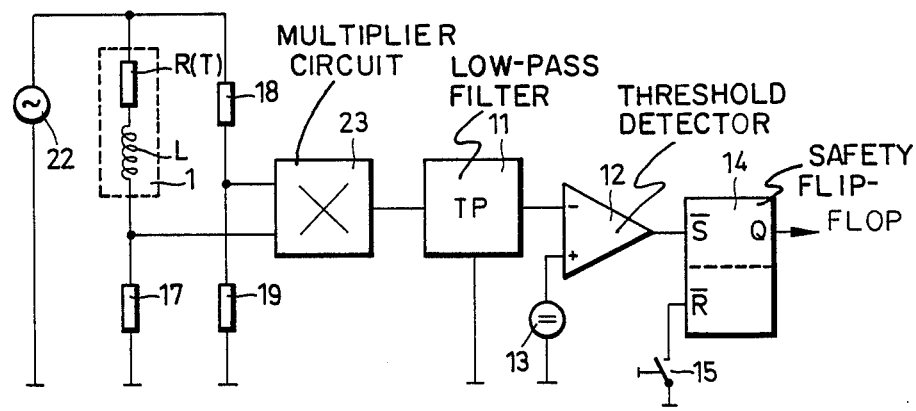

Lastly, FIG. 4 shows an embodiment having an AC voltage source 22 and a bridge circuit like that represented in FIG. 3 following it. To detect the variation of R with temperature, the pure acting component of the current I must first be formed. This is achieved by means of a multiplier circuit 23 whose inputs are connected to the comparison points of the bridge circuit. This multiplication circuit 23 produces the multiplication of the current-proportional signal, which is the voltage drop across the resistance 17, with the voltage-proportional signal which is the voltage drop across the resistance 19. The same could also be accomplished by phase-sensitive rectification of the voltage signals which depend on the resistances 17 and 19. The forming of the acting component of the current I is again followed by low-pass filter 11, detector 12, and safety flip-flop 14.

I claim:

1. A method for monitoring the temperature of a winding of a coil, the winding having a temperature-dependent resistance, in which said coil is a magnet coil of a magnetic valve having a body comprising: supplying a holding current holding the body of the valve in a certain position, and utilizing the holding current simultaneously as a measurement current.

2. A method in accordance with claim 1, which includes passing a constant electric current $I_M$ or one whose magnitude can be determined through the winding during a measuring time, and utilizing the voltage drop across the winding, which is dependent on the temperature of the winding, as the measurement magnitude.

3. A method in accordance with claim 1, which includes applying a constant voltage to the winding of the coil, and utilizing the current varying with the temperature of the winding as a measurement magnitude.

4. A method for monitoring the temperature of a winding of a coil subject to brief over-excitation, the winding having a temperature-dependent resistance, comprising:

utilizing the resistance dependent upon the temperature of a winding of the coil, subject to brief over-excitation, as a measurement magnitude that is to be tracked by passing an electric current having a constant average value through the winding during measuring time which is less than an entire operating time during which current is passed through the coil, and by utilizing the voltage drop across the winding, as a measurement magnitude for enabling control of the temperature of the winding.

5. A circuit for the practice of the method for monitoring the temperature of a winding of a coil the winding having a temperature-dependent resistance, in which said coil is a magnet coil of a magnetic valve having a body and whose operation is supplied by a holding current holding the body of the valve in a certain position while utilizing the holding current simultaneously as a measurement current, comprising:

a voltage source connected in series with the winding, and an electronic monitor connected between the voltage source and the winding.

6. A circuit in accordance with claim 5, comprising: a bridge circuit including the winding of the coil.

7. A circuit in accordance with claim 5, in which the electronic monitor includes a low-pass filter, a threshold detector, and a safety flip-flop.

8. A circuit in accordance with claim 7, comprising:

an altering voltage source, and a multiplier stage having inputs, and in which the bridge circuit has comparison points connected to the inputs of the multiplier stage.

9. A circuit for the practice of the method for monitoring the temperature of a winding of a coil, the winding having a temperature-dependent resistance, in which said coil is a magnet oil of a magnet valve having a body and whose operation is supplied by a holding current holding the body of the valve in a certain position while utilizing the holding current simultaneously as a measurement current, comprising:

a current source connected in series with the winding, and an electronic monitor connected between the current source and the winding.

* * * * *

UNITED STATES PATENT AND TRADEMARK OFFICE
CERTIFICATE OF CORRECTION

PATENT NO. : 4,799,046
DATED : January 17, 1989
INVENTOR(S) : Raymond Heinen

It is certified that error appears in the above-identified patent and that said Letters Patent is hereby corrected as shown below:

Column 3, line 16 for "mo switch" read

-- momentary-contact switch --.

Column 3, line 52 for "detector" read

-- threshold detector --.

Column 4, line 22 for "during" read -- during a --.

Column 4, line 52 for "oil" read -- coil --.

Column 4, line 52 for "magnet" read -- magnetic --.

Signed and Sealed this

Third Day of April, 1990

Attest:

HARRY F. MANBECK, JR.

Attesting Officer

Commissioner of Patents and Trademarks